(12) United States Patent
Slots

(10) Patent No.: US 12,162,233 B2
(45) Date of Patent: Dec. 10, 2024

(54) TIRE UNLOADING UNIT FOR UNLOADING A GREEN TIRE

(71) Applicant: VMI Holland B.V., Epe (NL)

(72) Inventor: Antonie Slots, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 18/573,935

(22) PCT Filed: Jun. 28, 2022

(86) PCT No.: PCT/NL2022/050367
§ 371 (c)(1),
(2) Date: Dec. 22, 2023

(87) PCT Pub. No.: WO2023/282739
PCT Pub. Date: Jan. 12, 2023

(65) Prior Publication Data
US 2024/0326364 A1    Oct. 3, 2024

(30) Foreign Application Priority Data

Jul. 9, 2021 (NL) ...................................... 2028684

(51) Int. Cl.
*B29D 30/00* (2006.01)
*B29D 30/26* (2006.01)

(52) U.S. Cl.
CPC ..... *B29D 30/0016* (2013.01); *B29D 30/2607* (2013.01); *B29D 2030/0022* (2013.01)

(58) Field of Classification Search
CPC .......... B62D 300/016; B62D 300/2607; B62D 2030/0022
See application file for complete search history.

(56) References Cited

U.S. PATENT DOCUMENTS

| 2,040,466 A | 5/1936 | Christy .............................. 154/9 |
| 6,105,648 A | 8/2000 | De Graaf et al. |

(Continued)

FOREIGN PATENT DOCUMENTS

| CA | 1241914 | 9/1988 | ............. E21B 43/12 |
| CN | 102015270 | 4/2011 | ............. B29D 30/20 |

(Continued)

OTHER PUBLICATIONS

Search Report issued in Netherlands Appln. Serial No. 2028684, dated Jul. 9, 2021, 4 pages.

(Continued)

*Primary Examiner* — Kaitlin S Joerger
(74) *Attorney, Agent, or Firm* — HAYES SOLOWAY P.C.

(57) ABSTRACT

A tire unloading unit for unloading a green tire, wherein the green tire has an externally facing circumferential tread surface extending around a tire axis, wherein the tire unloading unit has a base and a support for supporting the green tire relative to the base at the externally facing circumferential tread surface from below and an upper arm projecting from the base for stabilizing the green tire at the externally facing circumferential tread surface from above, wherein the upper arm includes a first lateral boundary member, a second lateral boundary member and intermediate boundary members which are individually movable to closely adapt to the contour of the green tire and remain in contact with said contour even when the green tire collapses slightly over time.

16 Claims, 8 Drawing Sheets

(56) References Cited

U.S. PATENT DOCUMENTS

| | | | |
|---|---|---|---|
| 9,584,806 B2 | 2/2017 | Wu et al. | |
| 2012/0145328 A1* | 6/2012 | Stoila | B29D 30/2607 156/394.1 |
| 2014/0130961 A1* | 5/2014 | Pan | B29D 30/2607 156/421.8 |
| 2019/0105860 A1* | 4/2019 | Russo, II | B29D 30/0016 |
| 2020/0061846 A1 | 2/2020 | Dubois | B25J 15/00 |
| 2022/0177287 A1* | 6/2022 | Cordova Opazo et al. | B60B 30/04 |
| 2024/0017508 A1* | 1/2024 | De Col | B29D 30/2607 |

FOREIGN PATENT DOCUMENTS

| | | | | |
|---|---|---|---|---|
| CN | 109476106 | | 3/2019 | ............ B29D 30/28 |
| CN | 218256921 | | 1/2023 | ............ B29D 30/20 |
| EP | 2463085 | | 12/2011 | |
| EP | 3487693 | | 5/2020 | ............ B29D 30/28 |
| JP | 60078729 | A * | 5/1985 | ............ B29D 30/26 |
| JP | 61-53012 | | 3/1986 | ............ B29C 33/04 |
| JP | 2001501548 | | 2/2001 | ............ B29D 30/28 |
| JP | 2012126135 | | 7/2012 | ............ B29D 30/08 |
| JP | 2015518690 | | 7/2015 | ........... H04N 19/597 |
| KR | 20200042094 | | 4/2020 | |
| WO | 2009131446 | | 10/2009 | |
| WO | 2013002823 | | 1/2013 | |
| WO | 2013091529 | | 6/2013 | |
| WO | WO2023282739 | | 1/2023 | ............ B29D 30/00 |

OTHER PUBLICATIONS

International Search Report and Written Opinion issued PCT/NL2022/050367, dated Nov. 21, 2022, 19 pages.

Japanese Decision on Appeal issued in Japanese Appln. Serial No. 2023-502822, dated Mar. 25, 2024 with translation, 5 pages.

Chinese Official Action issued in Chinese Appln. Serial No. 202210855960.0, dated Jul. 4, 2024 with translation, 13 pages.

* cited by examiner

TIRE UNLOADING UNIT FOR UNLOADING A GREEN TIRE

BACKGROUND

The invention relates to a tire unloading unit for unloading a green or unvulcanized tire.

The green tire is built on a tire building drum and is removed from said tire building drum once the tire building has been completed with the use of a tire unloading unit. The known tire unloading unit is provided with two lower arms and one upper arm which are insertable in the space between a transfer ring and the tire building drum such that the green tire may already be transferred to the tire unloading unit prior to or during retraction of the tire building drum. The upper arm is movable towards the two lower arms to stabilize the green tire in the tire unloading unit. Subsequently, the upper arm is moved away from the two lower arms to allow for weighing of the green tire and/or removal of the green tire from the tire unloading unit by a robot.

SUMMARY OF THE INVENTION

A disadvantage of the aforementioned removal of the green tire from the tire building drum and transfer to the tire unloading unit is that the steps are performed relatively quickly to reduce the cycle time of the tire building. The transfer ring, the tire building drum may unintentionally exert forces onto the green tire that may destabilize said green tire. The upper arm has to be pressed down relatively hard onto the green tire to prevent that the green tire falls over within the tire unloading unit. The forceful application of the upper arm on the green tire may cause imprints. It may even deform the general shape of the green tire.

Moreover, after the initial pressing down of the upper arm, the green tire may collapse slightly to a level below the reach of the upper arm, causing it to fall over despite the earlier attempts to stabilize it.

It is an object of the present invention to provide a tire unloading unit for unloading a green tire, wherein the green tire can be reliably stabilized.

According to a first aspect, the invention provides a tire unloading unit for unloading a green tire, an externally facing wherein the green tire has circumferential tread surface extending around a tire axis, wherein the tire unloading unit comprises a base and a support member for supporting the green tire relative to the base at the externally facing circumferential tread surface from below and an upper projecting from the base for arm stabilizing the green tire at the externally facing circumferential tread surface from above, wherein the upper arm comprises an arm body projecting in the lateral direction from the base and movable relative to the base in a clamping direction between a standby position and a hold position closer to the support member in the clamping direction than the standby position, wherein the upper arm comprises a first lateral boundary member and a second lateral boundary member, supported by said arm body, which are positionable on opposite sides of the green tire in a lateral direction at least partially alongside said green tire, wherein the upper arm comprises a plurality of intermediate boundary members located side-by-side in the lateral direction on the arm body between the first lateral boundary member and the second lateral boundary member, wherein the first lateral boundary member, the second lateral boundary member and the plurality of intermediate boundary members are individually movable in the clamping direction relative to the arm body and relative to each other.

In the standby position, the upper arm can be moved over the green tire in the lateral direction to correctly align the lateral boundary members at the respective sides of the green tire, before moving said upper arm down into the hold position in which the lateral boundary members extend alongside the green tire at said respective sides.

In particular, when used in combination with a transfer ring, the upper arm, in the standby position, is positioned relative to the transfer ring and the tire building drum such that the upper arm, including the lateral boundary members, fits in the space between said transfer ring and the tire building drum.

The intermediate boundary members can be used to contact the green tire in the area between the lateral boundary members, to more securely hold the green tire. Moreover, the intermediate boundary members can closely follow or adapt to the contour of the green tire and remain in contact with said contour even when the green tire collapses slightly over time.

Because the intermediate boundary members are independently movable, the set of the lateral boundary members and the intermediate boundary members can be used to reliably stabilize green tires of different shapes and sizes. In particular, if the width of the green tire is smaller than the distance between the lateral boundary members, the intermediate boundary members closest to the respective sides of the green tire can take over the functionality of lateral boundary member from the outermost lateral boundary members. Hence, any width of green tire can be reliably stabilized.

Moreover, the lateral boundary members and the intermediate boundary members can be individually positioned to follow the cross-sectional contour of the externally facing circumferential tread surface of the green tire as close and/or as accurately as possible. In particular, the lateral boundary members and the group of intermediate boundary members that are located at the transition from the externally facing circumferential tread surface to the sidewall, also known as the 'shoulder', can be positioned progressively in the clamping direction to closely follow the curvature of said shoulder. In this way, the green tire is not only stopped from falling over, its position on the support member can be secured more reliably, for example by also preventing minimal movements of the green tire relative to the support member.

In a preferred embodiment one or more intermediate boundary members of the plurality of intermediate boundary members are pivotable with respect to a normal plane perpendicular to the lateral direction from a first state parallel to said normal plane to a second state at an oblique angle to said normal plane. Preferably, the normal plane extends vertically or substantially vertically. When a relative movement is generated between the alternative tire unloading unit and the tire building drum in the removal direction to remove the green tire from said tire building drum, there may be a delay in the release of the green tire from the tire building drum or the green tire may not detach from the tire building drum at all. The pivoting of the boundary members may absorb an initial delay in the removal of the green tire without damaging said green tire. It may also provide some time to stop the removal process before the green tire is seriously damaged.

In another embodiment the tire unloading unit further comprises a first axial fixation member and a second axial fixation member immovably arranged on the upper arm in the lateral direction on opposite sides of a group comprising the first lateral boundary member, the second lateral boundary member and the intermediate boundary members.

Alternatively, the tire unloading unit further comprises a first axial fixation member and a second axial fixation member arranged on the upper arm in the lateral direction on opposite sides of a group comprising the first lateral boundary member, the second lateral boundary member and the intermediate boundary members, wherein at least one of the first axial fixation member and the second axial fixation member is movable in the lateral direction away from the other of the first axial fixation member and the second axial fixation member. This may provide some freedom of movement to the group of boundary members in the lateral direction in response to unexpected errors during the removal of the green tire from the tire building drum.

In a preferred embodiment thereof the at least one of the first axial fixation member and the second axial fixation member is biased to move towards the other of the first axial fixation member and the second axial fixation member. Hence, the group of boundary members can be kept in position on the arm body as if the at least one axial fixation member is fixed, until a force exerted onto said at least one axial fixation member exceeds a biasing force.

In a further embodiment thereof each boundary member of the group is pivotable with respect to a normal plane perpendicular to the lateral direction from a first state parallel to said normal plane to a second state at an oblique angle to said normal plane. This has the same technical advantages as mentioned in relation to an earlier embodiment introducing this feature.

Preferably, the first axial fixation member and the second axial fixation member are provided with a first chamfered surface and a second chamfered surface, respectively, facing the group to provide the first lateral boundary member and the second lateral boundary member, respectively, freedom to move from the first state into the second state. Hence, despite the presence of the axial fixation members, the boundary members are allowed to pivot.

More preferably, the first chamfered surface and the second chamfered surface extend point-symmetrically with respect to each other. In this manner, the chamfered surfaces provide the space for the boundary members to pivot.

In another embodiment, the first lateral boundary member, the second lateral boundary member and the plurality of intermediate boundary members each comprise a boundary body with a through opening in the lateral direction for receiving the arm body, wherein the arm body has an arm body height in the clamping direction and wherein the through opening has an opening height in the clamping direction that is greater than the arm body height, wherein the boundary body is slidable over the arm body in the clamping direction within a range defined by the difference between the arm body height and the opening height. The boundary body can thus be slid up and down in the clamping direction around the arm body in response to a contact of the respective boundary member with the green tire.

More preferably, the arm body is provided with two oppositely facing guide surfaces extending parallel to the clamping direction, wherein the through opening has two mutually facing sliding surfaces extending parallel to the clamping direction for sliding along the respective guide surfaces of the arm body. The interaction between guide surfaces and the slide surfaces can prevent that the boundary body moves relative to the arm body in any other direction other than the clamping direction. In particular, rotation of the boundary body about the arm body can be prevented. Hence, the orientation of the boundary body with respect to the arm body can be maintained.

Most preferably, the arm body has a rectangular cross section perpendicular to the lateral direction. The boundary body can slide along the parallel sides of said rectangular cross section.

In an alternative embodiment the first lateral boundary member, the second lateral boundary member and the plurality of intermediate boundary members each comprise a boundary body that is slidably received in a corresponding through hole in the arm body to be movable in the clamping direction relative to said arm body. The boundary body can thus be slid up and down in the clamping direction through the arm body in response to a contact of the respective boundary member with the green tire. There is no need to fixate the boundary members in the lateral direction because they are already restricted in said lateral direction by the respective through hole in the arm body.

In a further embodiment the first lateral boundary member, the second lateral boundary member and the plurality of intermediate boundary members are movable in the clamping direction relative to the arm body under the influence of gravity. In other words, the boundary members are free to move downwards in the clamping direction when the distance between the shaft and the green tire at the location of the respective boundary member allows for said downward movement. Consequently, no separate drive is required to actively push the boundary members down.

In a further embodiment the support member comprises a first lower arm projecting from the base in the lateral direction for supporting the green tire at the externally facing circumferential tread surface from below. The first lower arm can project from the base and extend underneath the green tire to support said green tire from below in at least one support position. A single lower arm can be sufficiently lean to fit into tight spaces, i.e. in the space left between the drum and the transfer ring.

More preferably the support member further comprises a second lower arm projecting from the base in the lateral direction for together with the first lower arm supporting the green tire at the externally facing circumferential tread surface from in below two circumferentially spaced apart support positions. The two lower arms can provide a more stable two-point support for the green tire.

According to a second aspect, the invention provides a tire unloading unit for unloading a green tire, wherein the green tire has an externally facing circumferential tread surface extending around a tire axis, wherein the tire unloading unit comprises a base and a support member for supporting the green tire relative to the base at the externally facing circumferential tread surface from below and an upper arm projecting from the base for stabilizing the green tire at the externally facing circumferential tread surface from above, wherein the upper arm comprises an arm body projecting in the lateral direction from the base and movable relative to the base in a clamping direction between a standby position and a hold position closer to the support member in the clamping direction than the standby position, wherein the upper arm comprises a first lateral boundary member and a second lateral boundary member, supported by said arm body, positionable on opposite sides of the green tire in a lateral direction alongside or at least partially said green tire, wherein the first lateral boundary member and the second lateral boundary member are arranged in a fixed position on the arm body. The upper arm can thus be positioned overhead the green tire with the lateral boundary members aligned in the clamping direction alongside the respective sides of the green tire, after which the upper arm can be moved down to position said lateral boundary members alongside the respective sides of the green tire in the lateral direction.

According to a third aspect, the invention provides a tire unloading unit for unloading a green tire, wherein the green tire has an externally facing circumferential tread surface extending around a tire axis, wherein the tire unloading unit comprises a base and a support member for supporting the green tire relative to the base at the externally facing circumferential tread surface from below and an upper arm projecting from the base for stabilizing the green tire at the externally facing circumferential tread surface from above, wherein the upper arm comprises an arm body projecting in the lateral direction from the base and movable relative to the base in a clamping direction between a standby position and a hold position closer to the support member in the clamping direction than the standby position, wherein the upper arm comprises a first lateral boundary member and a second lateral boundary member, supported by said arm body, positionable on opposite sides of the green tire in a lateral direction alongside or at least partially said green tire, wherein the first lateral boundary member and the second lateral boundary member are movable relative to the arm body in the lateral direction towards and away from each other. In this particular embodiment, the lateral position of the lateral boundary members can be adjusted to match the width of the green tire. Hence, variable tire widths can be accurately enclosed between the lateral boundary members by appropriately positioning said lateral boundary members in the lateral direction.

Preferably, the arm body is a spindle having oppositely threaded sections, wherein the upper arm further comprises a spindle drive for rotating the spindle and a first nut and a second nut for coupling the first lateral boundary member and the second lateral boundary member, respectively, to the oppositely threaded sections. By rotating the spindle, the nuts can be synchronously driven in opposite directions, thereby causing the lateral boundary members to approach or move away from each other.

According to a fourth aspect, the invention provides a tire unloading unit for unloading a green tire, wherein the green tire has an externally facing circumferential tread surface extending around a tire axis, wherein the tire unloading unit comprises a base and a support member for supporting the green tire relative to the base at the externally facing circumferential tread surface from below and an upper arm projecting from the base for stabilizing the green tire at the externally facing circumferential tread surface from above, wherein the upper arm comprises an arm body projecting in the lateral direction from the base and movable relative to the base in a clamping direction between a standby position and a hold position closer to the support member in the clamping direction than the standby position, wherein the upper arm comprises a first lateral boundary member and a second lateral boundary member, supported by said arm body, which are positionable on opposite sides of the green tire in a lateral direction at least partially alongside said green tire, wherein at least one of the first lateral boundary member and the second lateral boundary member is pivotable with respect to a normal plane perpendicular to the lateral direction from a first state parallel to said normal plane to a second state at an oblique angle to said normal plane.

The pivoting of the at least one lateral boundary member may, in a way similar to the pivoting boundary members according to the first aspect of the invention, prevents damage to the green tire when there is a delay in the removal of said green tire from the tire building drum.

Preferably, the normal plane extends vertically or substantially vertically.

In another embodiment the at least one of the first lateral boundary member and the second lateral boundary member is biased to move from the second state into the first state. Hence, the at least one lateral boundary member can assume its regular position to prevent that the green tire falls over, until a force exceeding the biasing force is exerted onto said at least one lateral boundary member.

According to a fifth aspect, the invention provides a tire unloading unit for unloading a green tire, wherein the green tire has an externally facing circumferential tread surface extending around a tire axis, wherein the tire unloading unit comprises a base and a support member for supporting the green tire relative to the base at the externally facing circumferential tread surface from below and an upper arm projecting from the base for stabilizing the green tire at the externally facing circumferential tread surface from above, wherein the upper arm comprises a first arm part that is movable relative to the base in a clamping direction between a standby position and a hold position closer to the support member in the clamping direction than the standby position, and a second arm part that is movable relative to the first arm part in the clamping direction over a stroke distance while the first arm part remains in the hold position.

In this way, the second arm part may follow the green tire as it collapses slightly over time to a level below the reach of the first art part, but within reach of the second arm part within the stroke distance, thereby ensuring that the stabilizing effect of the upper arm remains effective.

In one embodiment the first arm part is arranged for projecting in the lateral direction from the base across the green tire, wherein the second arm part is arranged to be supported by the first arm part above the green tire. Hence, the second arm part can be supported by the first arm part across the width of the green tire in the lateral direction.

Alternatively, the first arm part is located between the second arm part and the base, wherein the second arm part is supported by the first arm part and is arranged for projecting in the lateral direction from the first arm part across the green tire. Consequently, the second arm part is the only part extending across the green tire in the lateral direction, thereby simplifying the construction and/or reducing weight of the upper arm in a position directly above the green tire.

According to a sixth aspect, the invention provides a tire unloading unit for unloading a green tire, wherein the green tire has an externally facing circumferential tread surface extending around a tire axis, wherein the tire unloading unit comprises a base and a support member for supporting the green tire relative to the base at the externally facing circumferential tread surface from below and an upper arm projecting from the base for stabilizing the green tire at the externally facing circumferential tread surface from above, wherein the upper arm comprises an arm body projecting in the lateral direction from the base and movable relative to the base in a clamping direction between a standby position and a hold position closer to the support member in the clamping direction than the standby position, wherein the upper arm further comprises at least one boundary member that is supported by the arm body in such a way that it is positionable at an oblique angle to a vertical midplane coinciding with the tire axis.

It has been discovered that when removing the green tire from the tire unloading unit, the position of the upper arm in the hold position may hinder the removal of the green tire from the tire unloading. Moreover, when the green tire is returned to the tire unloading unit after inspection, it may get stuck between the upper arm and the support member at the bottom, thereby preventing that the green tire is returned fully to its original position. The green tire may for example be clamped between the upper arm and only one of the lower arms of the support member. The oblique orientation of the at least one boundary member allows for more easily removing the green tire from the tire unloading unit for inspection and can further ensure that the green tire, when returned to the tire unloading unit after inspection, can again be properly supported on the support member, more in particular by both lower arms of said support member. Specifically, because of the oblique orientation, the surface of the boundary member that contacts the green tire extends at an angle that is more tangent and/or less acute to the circumference of the green tire and therefore less likely to obstruct the removal or return of said green tire.

Preferably, the at least one boundary member comprise a boundary body with a through opening in the lateral direction for receiving the arm body, wherein the arm body is provided with facing guide surfaces extending parallel to the clamping direction, wherein the through opening has two mutually facing sliding surfaces extending parallel to the clamping direction for sliding along the respective guide surfaces of the arm body in the clamping direction, wherein the at least one boundary member is supported by the arm body in such a way that the clamping direction extends at the oblique angle to the vertical plane. The at least one boundary member can thus assume the same orientation as the obliquely positioned arm body.

In one embodiment the arm body has a rectangular cross section, wherein the rectangular cross section is arranged at the oblique angle to the vertical midplane. Hence, the boundary member can be held in the same orientation as the arm body, i.e. at a fixed oblique angle.

Alternatively, the arm body has a circular cross section, wherein the at least one boundary member is rotatable about said arm body into an oblique position corresponding to said oblique angle. The freely rotatable boundary member can assume a position or orientation that is convenient for removing the green tire for inspection and it can ensure proper support when the green tire is returned.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
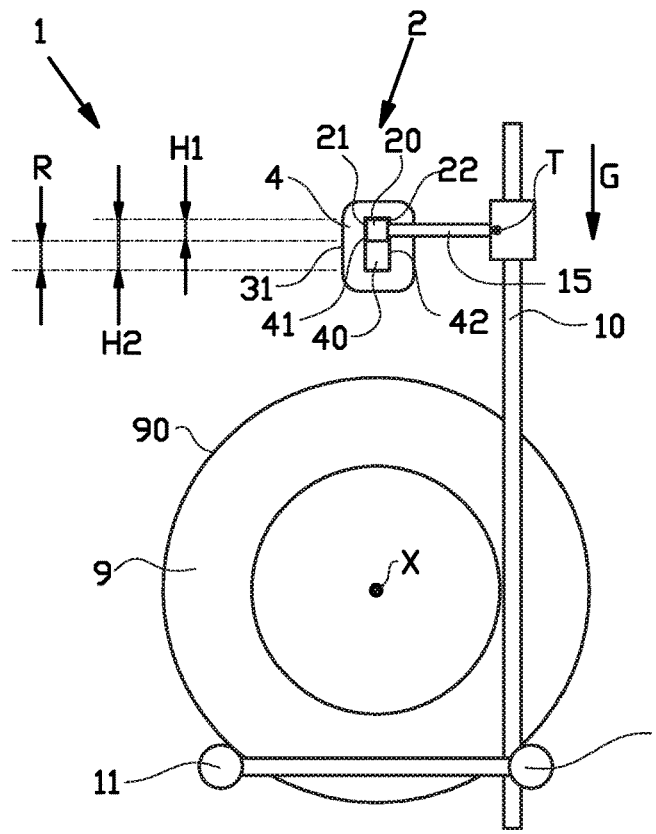
FIGS. 1 and 2 show side views of a tire unloading unit according to a first exemplary embodiment of the invention in a standby position and a hold position, respectively.
Figure 2:
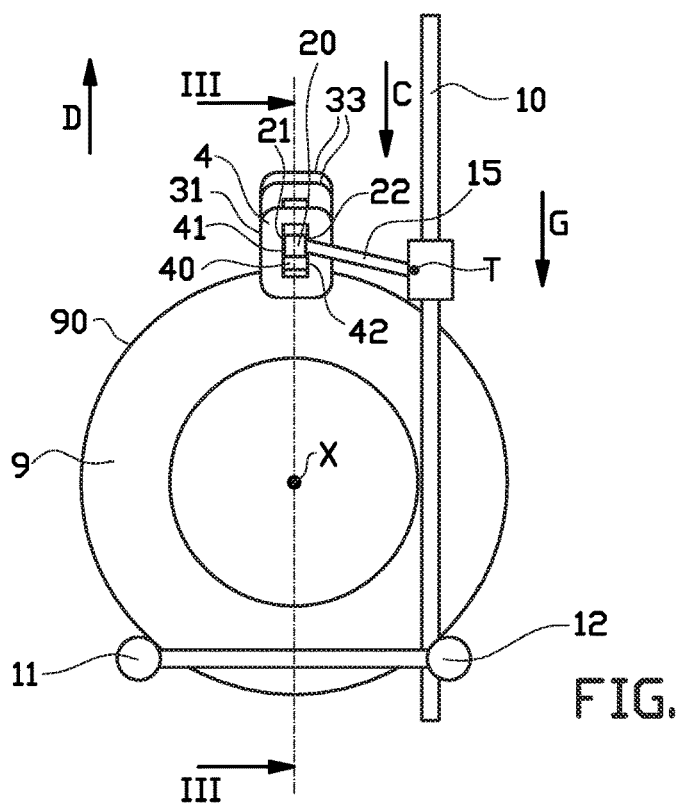
Figure 3:
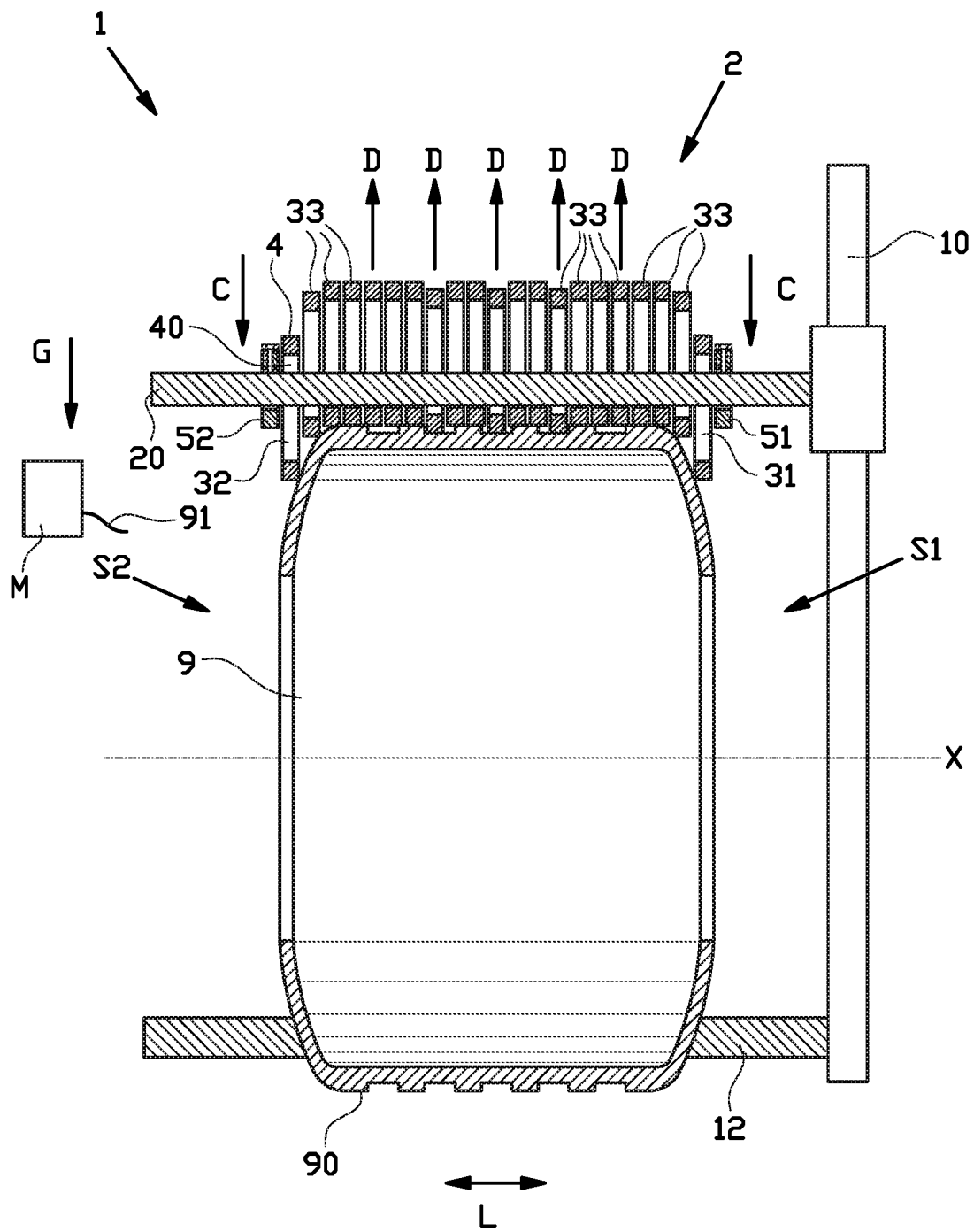
FIG. 3 shows a cross section of the tire unloading unit according to the line III-III in FIG. 2.

FIGS. 1-3 show a tire unloading unit 1 for unloading a green or unvulcanized tire 9 according to a first exemplary embodiment of the invention. The green tire 9 is built on a tire building drum and is removed from said tire building drum by the tire unloading unit 1 once the tire building has been completed. The tire unloading unit 1 may already be moved into position around the tire building drum when the tire building process is still operational or being completed, e.g. when a transfer ring for transferring one or more tire components to the tire building drum is still in a position around the drum. When the green tire 9 has been engaged by the tire unloading unit 1, the tire building drum and/or the transfer ring can subsequently be retracted and/or moved away. Alternatively, the tire building drum may remain in place and the tire unloading unit 1 can be retracted and/or moved away. The movements of the tire building drum and/or the tire unloading unit 9 are preferably controlled by a linear drive, for example a servo motor. The green tire 9—once stabilized—can be analyzed, inspected, measured, weighed and/or tagged in said tire unloading unit 1, prior to final unloading.

The green tire 9 has an externally facing circumferential tread surface 90, i.e. the circumferential surface that faces radially outwards. The tread surface 90 extends circumferentially and/or concentrically about a tire axis X. The tire unloading unit 1 is arranged for holding the green tire 9 in an upright orientation, i.e. with the tire axis X extending horizontally or substantially horizontally. The green tire 9 further has a first side S1 and a second side S2, opposite to the first side S1, in a lateral direction L parallel to said tire axis X.

As shown in FIGS. 1 and 2, the tire unloading unit 1 comprises a frame or a base 10 that represents the fixed world. The base 10 may be placed on the ground, i.e. the factory floor. The tire unloading unit 1 further comprises a support member 11, 12 comprising a first lower arm 11 and a second lower arm 12 that project from the base 10 in the lateral direction L for supporting the green tire 9 at the externally facing circumferential tread surface 90 from below in two circumferentially spaced apart support positions.

Alternatively, the tire unloading unit 1 may be provided with a single lower arm, table, platform or another suitable supporting element that has a width or geometry suitable to reliably support the green tire 9 from below.

The support member 11, 12 may be arranged so as to be movable along the base 10 into contact with the green tire 9 at the tire building drum.

The tire unloading unit 1 further comprises an upper arm 2 projecting from the base 10 for stabilizing the green tire 9 at the externally facing circumferential tread surface 90 from above. The upper arm 2 comprises an arm body 20 projecting in the lateral direction L from the base to stabilize the green tire 9 at the tread surface 90 from above. The arm body 20 is shaped like a shaft, rod or beam. The arm body 20 is movable along or relative to the base 10 in a clamping direction C between a standby position, as shown in FIG. 1, and a hold position, as shown in FIG. 2, closer to the first lower arm 11 in the clamping direction C than the standby position. In this example, the clamping direction C is vertical or substantially vertical. The upper arm 2 may cooperate with the support member 11, 12 to clamp the green tire 9 from opposite sides along the base 10 when the green tire 9 is still on the tire building drum.

In this exemplary embodiment, the tire unloading unit 1 comprises a tilt member 15 between the base 10 and the arm body 20 to position the arm body 20 relative to the base 10. In particular, the tilt member 15 is hingably connected to the base 10 in order to tilt about a tilt axis T parallel to the tire axis X. Consequently, the arm body 20 has some freedom of movement about the tilt axis T to move into towards the green tire 9 from above under the influence of gravity G.

As best seen in FIG. 3, the upper arm 2 comprises a set of boundary members 31-33, including a first lateral boundary member 31, a second lateral boundary member 32 and a plurality of intermediate boundary members 33. The lateral boundary members 31, 32 are positionable alongside said green tire 9 on the opposite sides S1, S2 of the green tire 9 in the lateral direction L. The plurality of intermediate boundary members 33 are located or arranged side-by-side in the lateral direction L on the arm body 20 between the first lateral boundary member 31 and the second lateral boundary member 32. In this exemplary embodiment, the lateral boundary members 31, 32 and the intermediate boundary members 33 are supported by said arm body 20, projecting downwards from said arm body 20 in the clamping direction C. In particular, the lateral boundary members 31, 32 and the intermediate boundary members 33 are movable, preferably individually and/or independently, in the clamping direction C relative to the arm body 20. In other words, each boundary member 31-33 of the group comprising the lateral boundary members 31, 32 and the intermediate boundary members 33 is individually and/or independently movable in the clamping direction C relative to the other boundary members 31-33 of the group, and with respect to the arm body 20.

In this example, the tire unloading unit 1 is provided with a first axial fixation member 51 and a second axial fixation member 52 which are immovably arranged on the upper arm 2 in the lateral direction L. The fixation members 51, 52 are located on opposite sides of a group formed by the boundary members 31-33, to fix said group in place on the upper arm 2 relative to the lateral direction L.

As shown in FIG. 3, each boundary member 31-33 comprises a boundary body 4 with a through opening 40 in the lateral direction for receiving the arm body 20. In this exemplary embodiment, the boundary body 4 is planar or plate-like and preferably has a rectangular or substantially rectangular cross section, as shown in FIGS. 1 and 2. Alternatively, the boundary body 4 may have a different cross-sectional shape, i.e. a round or disc-shape.

As shown in FIG. 1, the arm body 20 has an arm body height H1 in the clamping direction C. The through opening 40 has an opening height H2 in the clamping direction C that is greater than the arm body height H1. The boundary body 4 is slidable over the arm body 20 in the clamping direction C within a stroke or a range R defined by the difference between the arm body height H1 and the opening height H2. In particular, the arm body 20 is provided with two oppositely facing guide surfaces 21, 22 extending parallel to the clamping direction C. The through opening 40 has two mutually facing sliding surfaces 41, 42 complimentary to the guide surfaces 21, 22 and extending parallel to the clamping direction C for sliding along said respective guide surfaces 21, 22 of the arm body 20. In this example, the arm body 20 has a rectangular or square cross section, or a substantially rectangular or square cross section. Preferably, the through opening 40 has a rectangular inner contour.

As shown in FIG. 3, the boundary members 31-33 are movable in the clamping direction C relative to the arm body 20 under the influence of gravity G. The boundary members 31-33 start out in the standby position of FIG. 1 being lowered into their lowermost position on the arm body 20, i.e. at the end of the range R. The arm body 20 is then lowered towards the green tire 9 and, upon contact with the green tire 9, the boundary members 31-33 that come into contact with the green tire 9 are pushed upwards in an upward direction D opposite to the clamping direction C. In the hold position, as shown in FIG. 3, each boundary member 31-33 either contacts the tread surface 90 of the green tire 9 or remains at the end of the range R relative to the arm body 20 alongside the green tire 9 in the lateral direction L. As such, the group of boundary members 31-33 is able to closely and/or accurately follow the contour or cross-sectional shape of the green tire 9, in particular the contour of the tread surface 90, thereby limiting the freedom of movement of the green tire 9 in the tire unloading unit 1 and thus effectively stabilizing the green tire 9. More specifically, the boundary members 31-33 extending at, near, around and/or alongside the shoulders of the green tire 9, i.e. at the transition from the tread surface 90 to the sides S1, S2, can stop the green tire 9 from falling over in the tire unloading unit 1.

Figure 4:
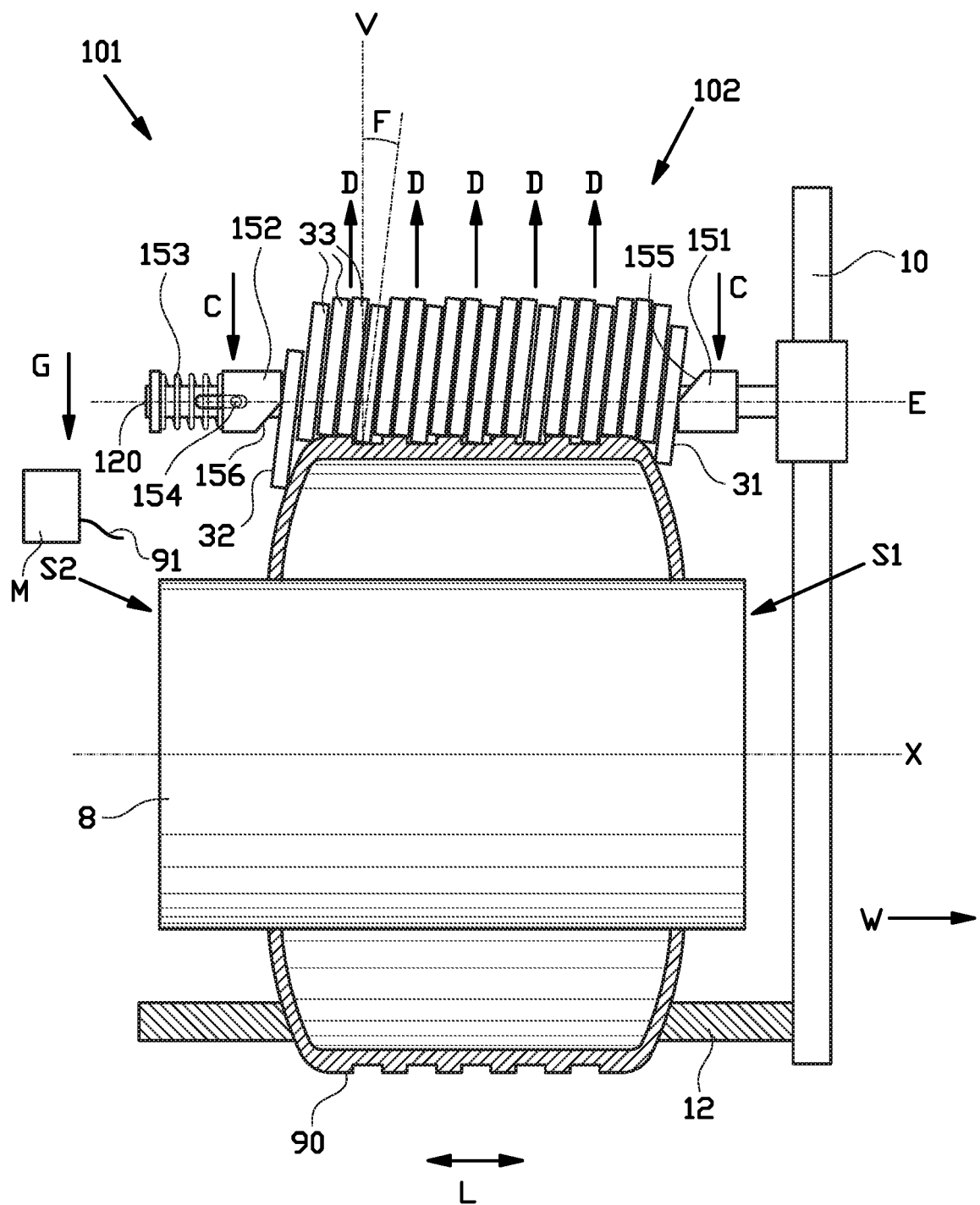
FIG. 4 shows an alternative tire unloading unit according to a second exemplary embodiment of the invention.

FIG. 4 shows an alternative tire unloading unit 101 according to a second exemplary embodiment of the invention, that differs from the further alternative tire unloading unit 1 according to the first exemplary embodiment of the invention in that the first lateral boundary member 31, the second lateral boundary member 32 and the intermediate boundary members 33 are pivotable with respect to a normal plane V perpendicular to the lateral direction L from a first state parallel to said normal plane V (similar to FIG. 3) to a second state at an oblique angle F to said normal plane V. In this example, the normal plane V extends vertically or substantially vertically. When a relative movement is generated between the alternative tire unloading unit 101 and the tire building drum 8 in the removal direction W to remove the green tire 9 from said tire building drum 8, there may be a delay in the release of the green tire 9 from the tire building drum 8 or the green tire 9 may not detach from the tire building drum 8 at all. The pivoting of the boundary members 31-33 may absorb an initial delay in the removal of the green tire 9 without damaging said green tire 9. It may also provide some time to stop the removal process before the green tire 9 is seriously damaged.

As shown in FIG. 4, the alternative tire unloading unit 101 further comprises a first axial fixation member 151 and a second axial fixation member 152 arranged on the upper arm 120 in the lateral direction L on opposite sides of a group comprising the first lateral boundary member 31, the second lateral boundary member 32 and the intermediate boundary members 33. The axial fixation members 151, 152 differ from the aforementioned axial fixation members 51, 52 in that the second axial fixation member 152 is movable in the lateral direction L away from the first axial fixation member 151. As such, the second axial fixation member 152 may provide some freedom of movement to the group of boundary members 31-33 in the lateral direction L, for example to allow for the aforementioned pivoting of the boundary members 31-33 in response to a delay in the release of the green tire 9 from the tire building drum 8.

In this example, the alternative tire unloading unit 101 comprises a biasing element 153, for example a spring, for biasing the second axial fixation member 152 towards the first axial fixation member 151. Hence, the group of boundary members 31-33 can be kept in position on the arm body 120 as if the second axial fixation member 152 is fixed, until a force exerted onto said second axial fixation member 152 exceeds a biasing force exerted by the biasing element 153 onto said second axial fixation member 152.

Moreover, in this example, the first axial fixation member 151 and the second axial fixation member 152 are provided with a first chamfered surface 155 and a second chamfered surface 156, respectively, facing the group of boundary members 31-33 to provide the first lateral boundary member 31 and the second lateral boundary member 32, respectively, freedom to move from the first state into the second state. The chamfered surfaces 155, 156 are located on opposite sides of a horizontal midplane E extending through the heart of the arm body 120. In this exemplary embodiment, the first chamfered surface 155 and the second chamfered surface 156 extend point-symmetrically with respect to each other, in particular on opposite sides of said horizontal midplane E. More in particular, the chamfered surfaces 155, 156 extend parallel or mutually parallel, or at inclined in the same direction.

Optionally, each axial fixation member 151, 152 may be provided with two chamfered surfaces forming a triangular tip portion (not shown) symmetrical to the horizontal midplane E to allow for pivoting of the group of boundary members 31-33 to both sides of the normal plane V.

Figure 5:
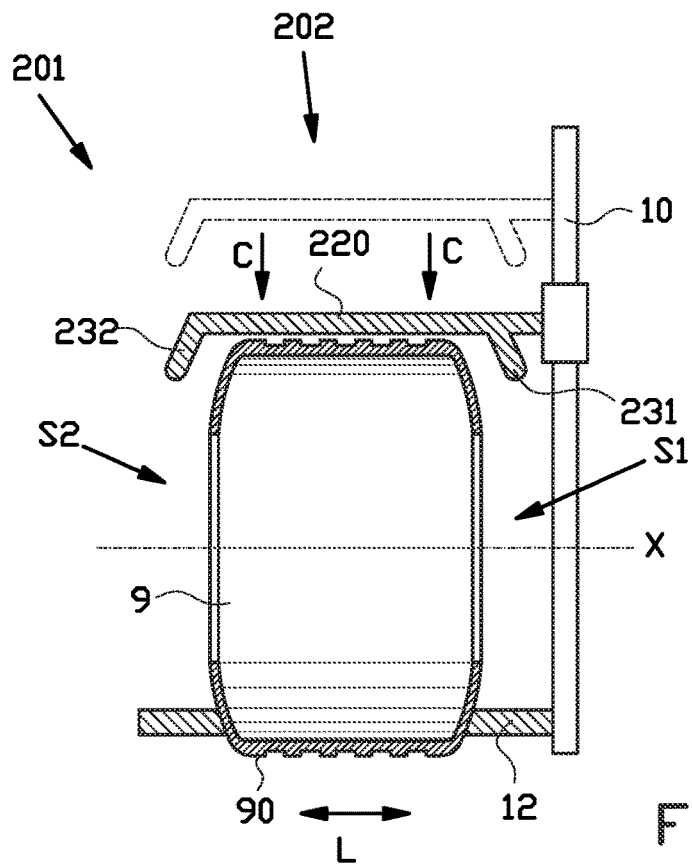
FIG. 5 shows a cross section of a further alternative tire unloading unit according to a third exemplary embodiment of the invention.

FIG. 5 shows a further alternative tire unloading unit 201 according to a third exemplary embodiment of the invention, that differs from the aforementioned tire unloading units 1, 101 in that the upper arm 202 comprises an arm body 120 and two lateral boundary members 231, 232 arranged in a fixed position on the arm body 220, both in the lateral direction L and the clamping direction C. In this exemplary embodiment, the lateral boundary members 231, 232 are integrated with or integral to the arm body 220. Alternatively, the lateral boundary members 231, 232 may be fastened to the arm body 220 in a fixed position. The arm body 220 is lowered onto the green tire 9 with the lateral boundary members 231, 232 extending alongside the respective sides S1, S2 of the green tire 9, preventing said green tire 9 from falling over in the further alternative tire unloading unit 201.

In this third embodiment of the invention, the upper arm 202 does not feature intermediate boundary members. Depending on the proximity of the lateral boundary members 231, 232 to the green tire 9 in the lateral direction L, the green tire 9 may still have some limited freedom of movement relative to the further alternative tire unloading unit 201.

Figure 6:
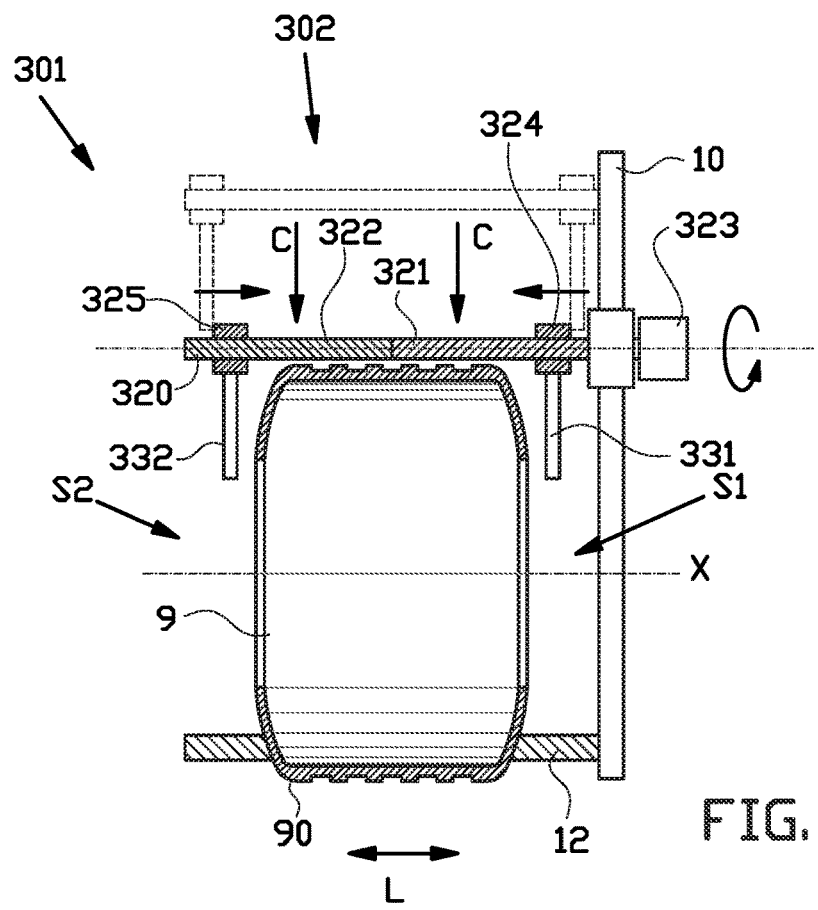
FIG. 6 shows a cross section of a further alternative tire unloading unit according to a fourth exemplary embodiment of the invention.

FIG. 6 shows a further alternative tire unloading unit 301 according to a fourth exemplary embodiment of the invention, that differs from the previously discussed tire unloading units 1, 201 in that its upper arm 302 comprises an arm body 320 in the form of a spindle having oppositely threaded sections 321, 322 and a spindle drive 323 for rotating the arm body 320. The upper arm 302 further comprises a first nut 324 and a second nut 325 for coupling the first lateral boundary member 331 and the second lateral boundary member 332, respectively, to the oppositely threaded sections 321, 322. Hence, upon rotation of the arm body 320, the interaction between the nuts 324, 325 and the oppositely threaded sections 321, 322 causes the lateral boundary members 331, 332 to synchronously move towards or away from each other, thereby approaching or moving away from the respective sides S1, S2 of the green tire 9. In other words, the lateral positions of the lateral boundary members 331, 332 can be adjusted and/or varied to match or approximate the width of the green tire 9.

Figure 7:
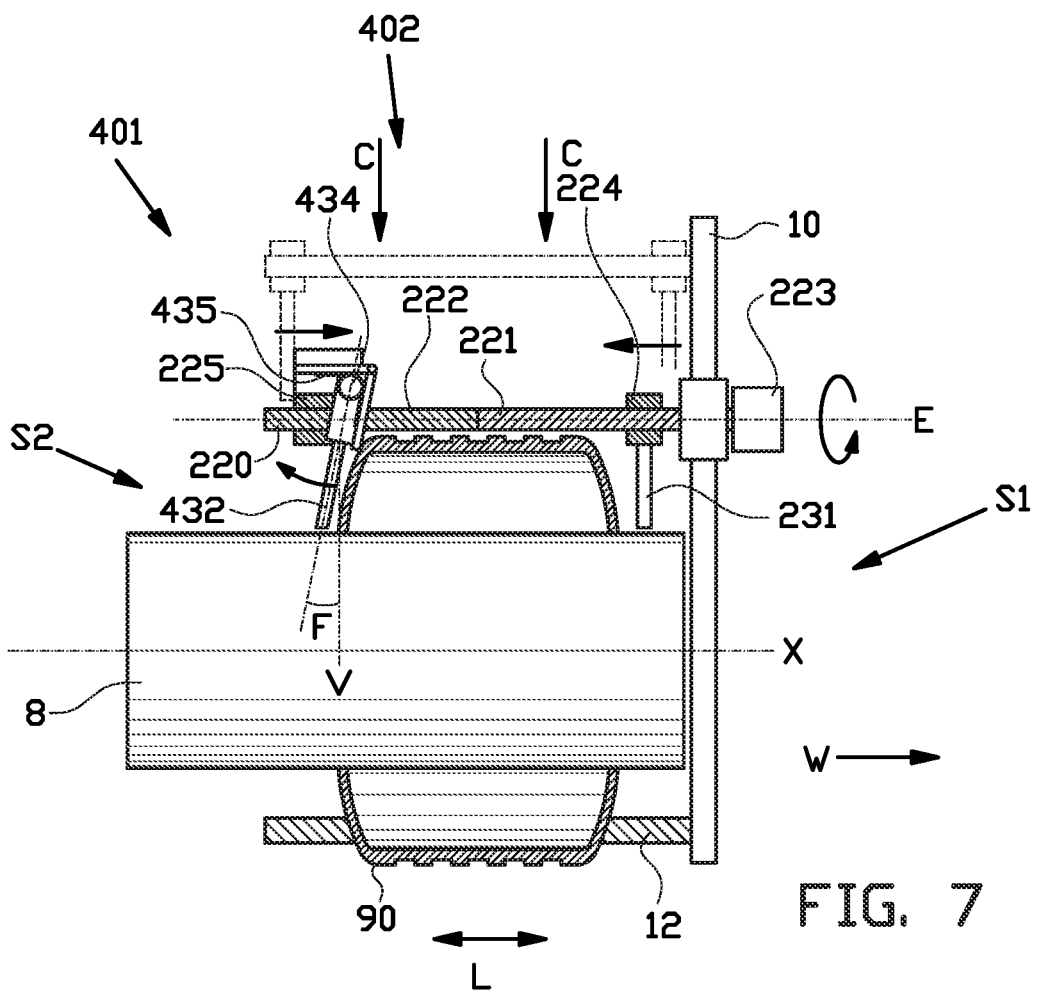
FIG. 7 shows cross section of a further alternative tire unloading unit according to a fifth exemplary embodiment of the invention.

FIG. 7 shows a further alternative tire unloading unit 401 according to a fifth exemplary embodiment of the invention, that differs from the further alternative tire unloading unit 301 according to the fourth exemplary embodiment of the invention in that the second lateral boundary member 432 is pivotable with respect to a normal plane V perpendicular to the lateral direction L from a first state parallel to said normal plane V to a second state at an oblique angle F to said normal plane V. In this example, the normal plane V extends vertically or substantially vertically. In the embodiment as shown, the further alternative tire unloading unit 401 comprises a hinge 434 to facilitate the pivoting of the second lateral boundary member 432. Moreover, the further alternative tire unloading unit 401 comprises a biasing element 435, for example a spring, for biasing the second lateral boundary member 432 from the second state towards and/or into the first state. The pivoting of the second lateral boundary member 432 may, in a way similar to the pivoting boundary members 131-133 according to the second embodiment of the invention, prevent damage to the green tire 9 when there is a delay in the removal of said green tire 9 from the tire building drum 8.

Figure 8:
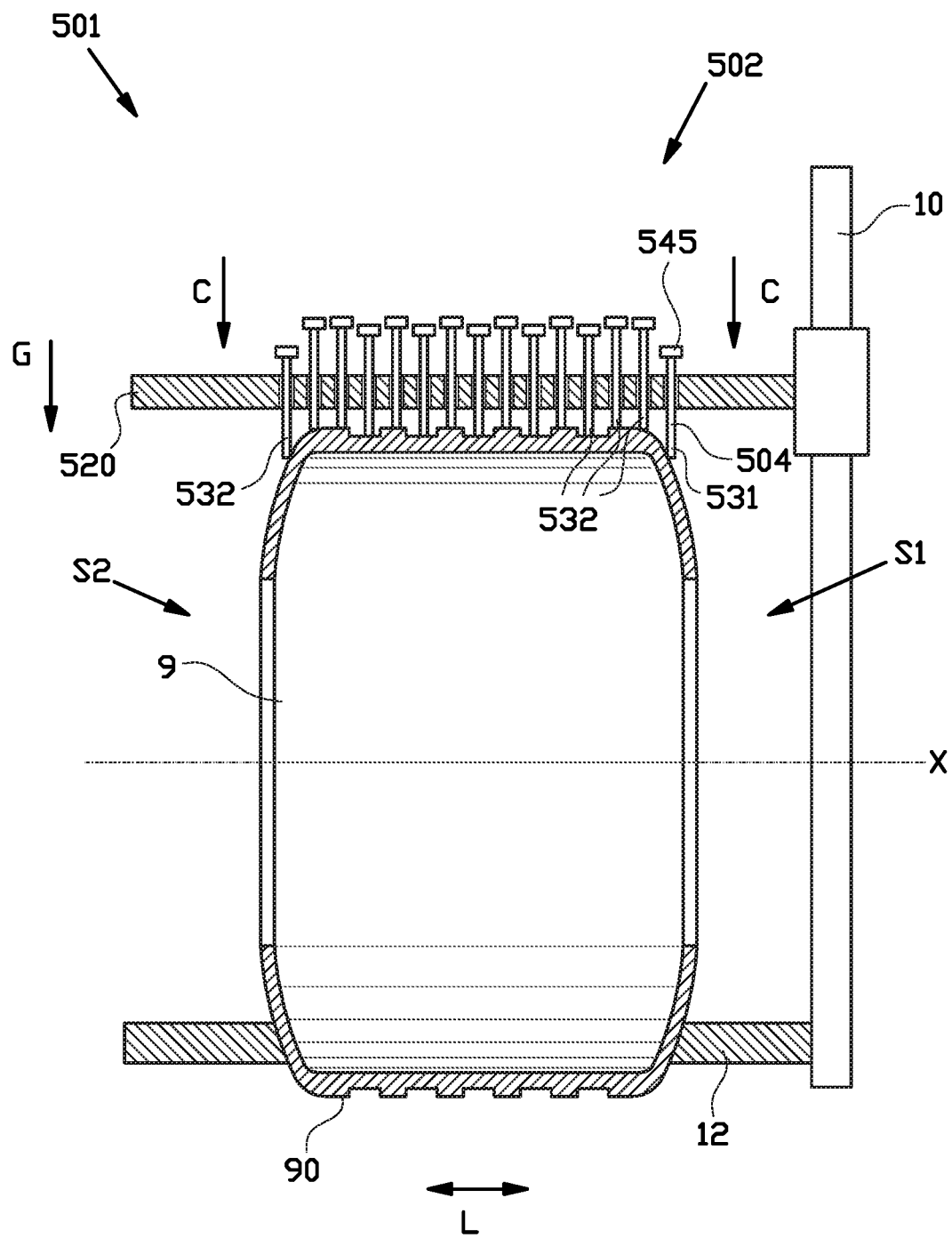
FIG. 8 shows a cross section of a further alternative tire unloading unit according to a sixth exemplary embodiment of the invention.

FIG. 8 shows a further alternative tire unloading unit 501 according to a sixth exemplary embodiment of the invention, that differs from the previously discussed tire unloading unit 1 according to the first embodiment of the invention in that each boundary member 531, 532, 533 has a boundary body 504 that is received through the arm body 520 of the upper arm 502, in contrast to the boundary bodies 4 of FIG. 3 which are fitted around the arm body 20. In particular, the boundary bodies 504 are shaped like pins, needles or the like which are slidably in corresponding through holes in the arm body 520 to be movable in the clamping direction C relative to said arm body 520. At the upper end of the boundary body 504, each boundary member 531-533 is provided with a limiter 545 that is wider than the dimension of the through hole in the arm body 520 to prevent that the boundary member 531-533 falls through the arm body 520 completely. The boundary bodies 504 can project freely and/or variably through the arm body 520 into contact with the contour and/or the sides S1, S2 of the green tire 9. The boundary members 531-533 can be moved under the influence of gravity in the same way as the previously discussed boundary members 31-33.

Figure 9:
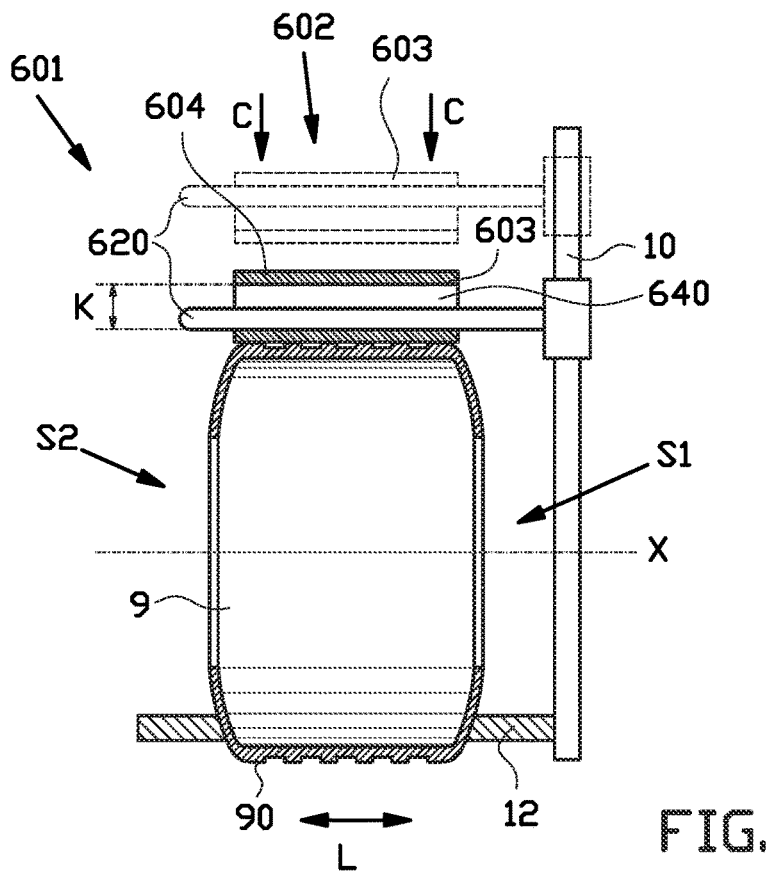
FIG. 9 shows a cross section of a further alternative tire unloading unit according to a seventh exemplary embodiment of the invention.

FIG. 9 shows a further alternative tire unloading unit 601 according to a seventh exemplary embodiment of the invention, that differs from the aforementioned tire unloading units 1, 201, 301, 401, 501 in that the upper arm 602 comprises a first arm part 620 that is movable relative to the base 10 in the clamping direction C between a standby position and a hold position closer to the support member 12 in the clamping direction C than the standby position. The first arm part 620 projects in the lateral direction L from the base 10 across the green tire 9.

The upper arm 602 further comprises a second arm part 603 that is supported by the first arm part 620 above the green tire 9. The second arm part 603 is movable relative to the first arm part 620 in the clamping direction C over a stroke distance K while the first arm part 620 remains in the hold position. The first arm part 620 may for example be locked in place by a drive that is responsible for moving said first arm part 620 up and down along the base 10. In particular, the second arm part 603 may be formed with a boundary body 604 having a through opening 640 for receiving the first arm part 620. The through opening 640 has a height in the clamping direction C that is greater than the height of the first arm part 620 in the same clamping direction C, thus defining the stroke distance K.

In this example, the movement of the second arm part 603 relative to the first arm part 620 within the stroke distance K is a free or undriven movement, e.g. under the influence of gravity. The second arm part 603 may for example follow the green tire 9 as it collapses slightly over time to a level below the reach of the first art part 620, but within reach of the second arm part 603 within the stroke distance K, thereby ensuring that the stabilizing effect of the upper arm 602 remains effective.

In contrast to the previous embodiments, the boundary body 604 of the second arm part 603 may be formed as a single, integral body extending across a considerable part of the width of the green tire 9.

Figure 10:
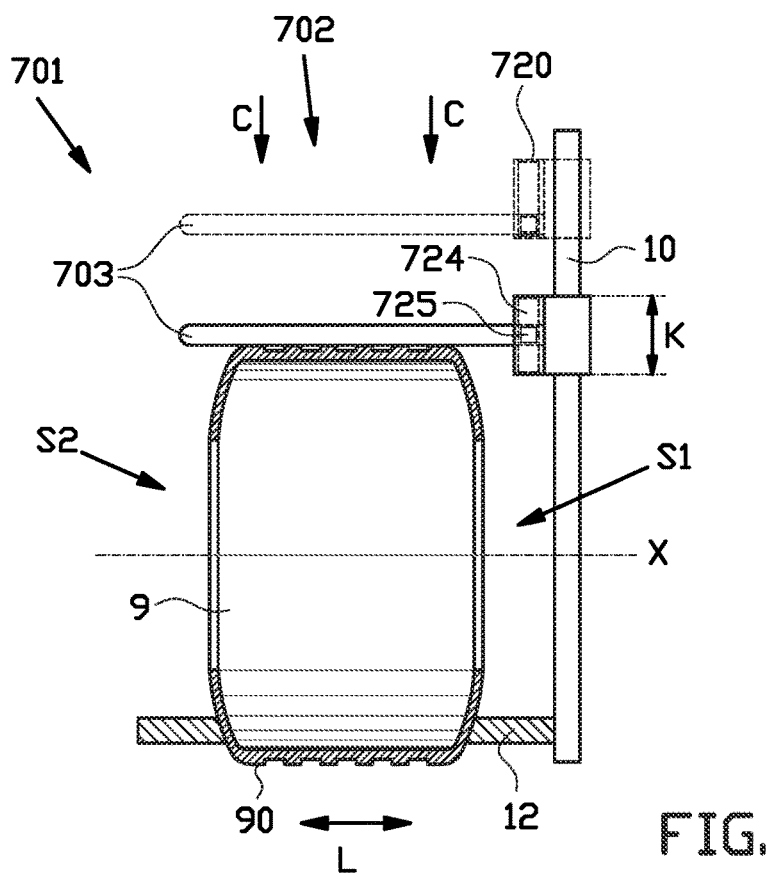
FIG. 10 shows a cross section of a further alternative tire unloading unit according to an eighth exemplary embodiment of the invention.

FIG. 10 shows a further alternative tire unloading unit 701 according to an eighth exemplary embodiment of the invention, that differs from the further alternative tire unloading unit according to the seventh exemplary embodiment of the invention only in that its first arm part 720 is located between the second arm part 703 and the base 10. The second arm part 703 is supported by the first arm part 720 and is arranged for projecting in the lateral direction L from the first arm part 720 across the green tire 9. In this exemplary embodiment, the first arm part 720 is provided with vertical slot 724 and the second arm part 703 is provided with a square pin 725 engaging said vertical slot 724 in a slidable manner to move within the stroke distance K. Alternatively, a linkage or another suitable mechanism may be provided to support the second arm part 703 with respect to the first arm part 720 and to provide said second arm part 703 with the freedom of movement within the stroke distance K.

Figure 11:
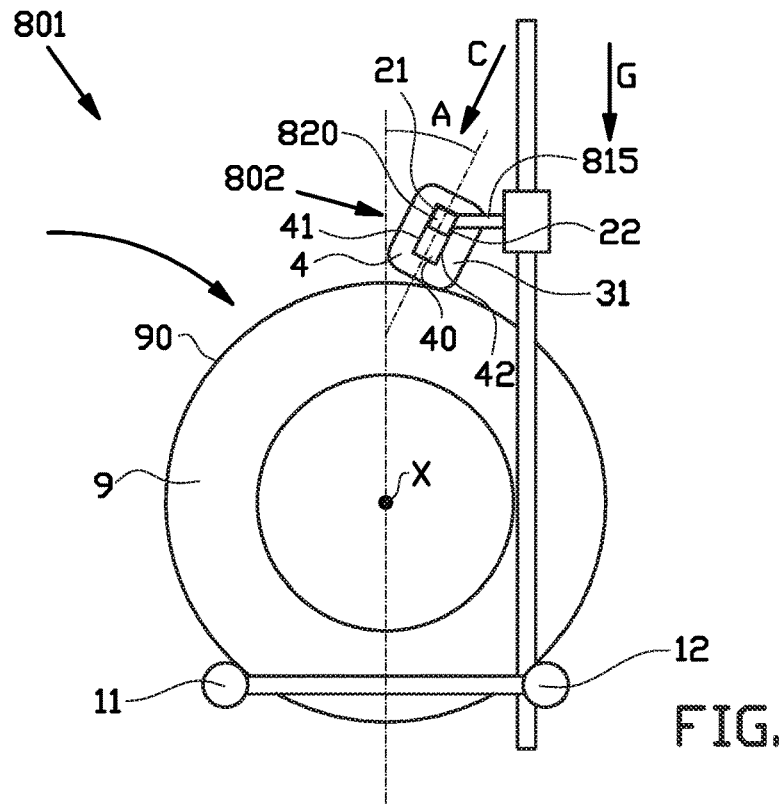
FIG. 11 shows a side view of a further alternative tire unloading unit according to a ninth exemplary embodiment of the invention.

FIG. 11 shows a further alternative tire unloading unit 801 according to a ninth exemplary embodiment of the invention, that differs from the tire unloading unit 1 according to the first exemplary embodiment of the invention in that the upper arm 802 is provided with at least one boundary member 31 that is supported by the arm body 820 in such a way that it is arranged at an oblique angle A to a vertical midplane Z coinciding with the tire axis X. In this example, the arm body 820 has a rectangular cross section which is arranged at the oblique angle A to the vertical midplane A. In particular, the at least one boundary member 31 comprise a boundary body 4 with a through opening 40 in the lateral direction L for receiving the arm body 820. The arm body 820 is provided with two oppositely facing guide surfaces 21, 22 extending parallel to the clamping direction C. Similarly, the through opening 40 has two mutually facing sliding surfaces 41, 42 extending parallel to the clamping direction C for sliding along the respective guide surfaces 21, 22 of the arm body 820 in the clamping direction C. As such, the at least one boundary member 31 is supported by the arm body 820 in such a way that the clamping direction C extends at the oblique angle A to the vertical plane Z. In other words, the at least one boundary member 31 thus assumes the same orientation as the obliquely positioned arm body 820. The oblique orientation of the at least one boundary member 31 allows for more easily removing the green tire 9 from the further alternative tire unloading unit 801 for inspection and can further ensure that the green tire 9, when returned to the further alternative tire unloading unit 801 after inspection, can again be properly supported on the support member, more in particular by both lower arms 11, 12 of said support member.

Figure 12:
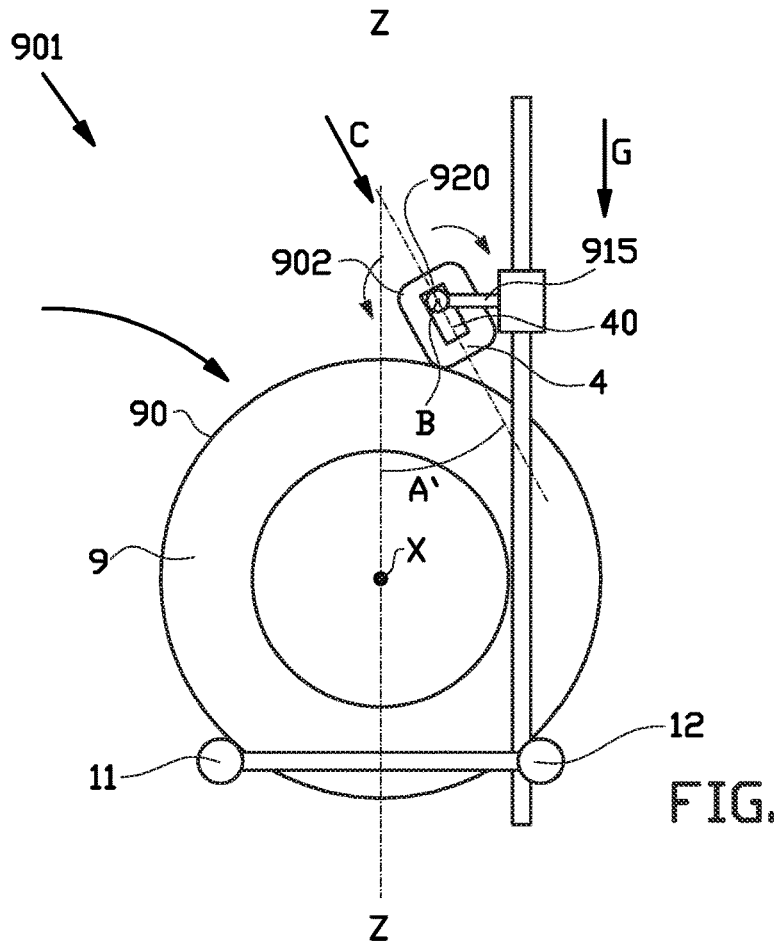
FIG. 12 shows a side view of a further alternative tire unloading unit according to a tenth exemplary embodiment of the invention.

FIG. 12 shows a alternative tire further unloading unit 901 according to a tenth exemplary embodiment of the invention, that differs from the further alternative tire unloading unit 801 according to the ninth exemplary embodiment of the invention only in that the upper arm 902 has an arm body 920 that has a circular cross section. The at least one boundary member 31 can thus be freely rotated about said arm body, in particular about a rotation axis B concentric to said arm body 920, into an oblique position corresponding with an oblique angle A' to the vertical midplane Z. Similarly to the previously discussed embodiment, the freely rotatable boundary member 31 can assume a position or orientation that is convenient for removing the green tire 9 for inspection and it can ensure proper support when the green tire 9 is returned.

Note that in the embodiments of FIGS. 11 and 12, the further alternative tire unloading units 801, 901 are provided with a holder 815, 915 that is significantly shorter than the tilt member 15 according to the first embodiment of the invention such that the upper arm 802, 902 is in a position spaced apart from the vertical midplane Z. This further opens up the space between the boundary member 31 and the lower arms 11, 12 of the support member to facilitate smoother removal and return of the green tire 9.

Each of the aforementioned tire unloading units 1, 101, 201, 301, 401, 501, 601, 701, 801, 901 may be used in a method for unloading or removing the green tire 9 from a tire building drum, using the respective upper arms 2, 102, 202, 302, 402, 502, 602, 702, 802 in the manner as previously described.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, the spindle-and-nut mechanism as shown in FIG. 6 may be replaced by any other suitable linear drive mechanism, i.e. one or more servo-motors, a gear rack, a timing belt or the like.

Furthermore, embodiments are envisioned in which the lateral boundary members are kept close to or parallel to the arm body during the interaction of the tire unloading unit with the transfer ring and/or the tire building drum to minimize the dimensions of upper arm, given the limited space available between the transfer ring and the tire building drum. Such lateral boundary members may be deployed, extended and/or folded outwards after the tire building drum and/or the transfer ring have cleared and/or moved away from the tire unloading unit.

As shown in FIG. 3, a marking device M may be provided at or near the tire unloading unit 1 for marking the green tire 9 when manufacturing of said green tire has been completed, i.e. just prior to, during or after unloading. In this example, the marking device M produces a sticker 91 with information related to the completed green tire 9, e.g. a serial number, a bar code, a QR code or the like. Alternatively, the marking device M may be a printer that prints a marking directly on the green tire 9. In yet a further alternative embodiment, the marking device M may be configured for creating the marking directly on or in the material of the green tire 9, i.e. by engraving.

In the prior art, such a marking is provided prematurely on a part of the green tire or an incomplete green tire, for example to the side wall. With further manufacturing steps still to be performed, there is a risk that the premature marking is lost, for example when it is applied to a part of the green tire that is cut away.

The present invention provides a method in which the marking 91 is applied to the green tire 9 when the construction of said green tire 9 has already been completed, in particular when said green tire 9 is held in a completed state in the tire unloading unit 1 or just after unloading.

LIST OF REFERENCE NUMERALS 1 tire unloading unit
10 base
11 first lower arm
12 second lower arm
15 tilt member
2 upper arm
20 arm body
21 first guide surface
22 second guide surface
31 first lateral boundary member
32 second lateral boundary member
33 intermediate boundary member
4 boundary body
40 through opening
41 first slide surface
42 second slide surface
51 first axial fixation member
52 second axial fixation member
8 tire building drum
9 green tire
90 externally facing circumferential tread surface
91 marking
101 alternative tire unloading unit
102 upper arm
151 first axial fixation member
152 second axial fixation member
153 biasing element
154 limiter
201 further alternative tire unloading unit
202 upper arm
220 arm body
231 first lateral boundary member
232 second lateral boundary member
301 further alternative tire unloading unit
302 upper arm
320 arm body
321 first threaded section
322 second threaded section
323 spindle drive
324 first nut
325 second nut
331 first lateral boundary member
332 second lateral boundary member
401 further alternative tire unloading unit
402 upper arm
432 second lateral boundary member
434 hinge
435 biasing element
501 further alternative tire unloading unit
502 upper arm
520 arm body
531 first lateral boundary member
532 second lateral boundary member
533 intermediate boundary member
504 boundary body
545 limiter
601 further alternative tire unloading unit
602 upper arm
620 first arm part
603 second arm part
604 boundary body
640 through opening
701 further alternative tire unloading unit
702 upper arm
720 first arm part
724 vertical slot
725 pin
801 further alternative tire unloading unit
815 holder
802 upper arm
820 arm body
901 further alternative tire unloading unit
915 holder
902 upper arm
920 arm body
A oblique angle
A' oblique angle
B rotation axis
C clamping direction
D upward direction
E horizontal midplane
F oblique angle
G gravity
H1 arm body height
H2 opening height
K stroke
L lateral direction
M marking device
R range
S1 first side
S2 second side
T tilt axis
X tire axis
V normal plane
W removal direction
Z vertical midplane

The invention claimed is:

1. A tire unloading unit for unloading a green tire, wherein the green tire has an externally facing circumferential tread surface extending around a tire axis, wherein the tire unloading unit comprises a base and a support member for supporting the green tire relative to the base at the externally facing circumferential tread surface from below and an upper arm projecting from the base for stabilizing the green tire at the externally facing circumferential tread surface from above, wherein the upper arm comprises an arm body projecting in the lateral direction from the base and movable relative to the base in a clamping direction between a standby position and a hold position closer to the support member in the clamping direction than the standby position, wherein the upper arm comprises a first lateral boundary member and a second lateral boundary member, supported by said arm body, which are positionable on opposite sides of the green tire in a lateral direction at least partially alongside said green tire, wherein the upper arm comprises a plurality of intermediate boundary members located side-by-side in the lateral direction on the arm body between the first lateral boundary member and the second lateral boundary member, wherein the first lateral boundary member, the second lateral boundary member and the plurality of intermediate boundary members are individually movable in the clamping direction relative to the arm body and relative to each other.

2. The tire unloading unit according to claim 1, wherein one or more intermediate boundary members of the plurality of intermediate boundary members are pivotable with respect to a normal plane perpendicular to the lateral direction from a first state parallel to said normal plane to a second state at an oblique angle to said normal plane.

3. The tire unloading unit according to claim 2, wherein the normal plane extends vertically.

4. The tire unloading unit according to claim 1, wherein the tire unloading unit further comprises a first axial fixation member and a second axial fixation member immovably arranged on the upper arm in the lateral direction on opposite sides of a group comprising the first lateral boundary member, the second lateral boundary member and the intermediate boundary members.

5. The tire unloading unit according to claim 1, wherein the tire unloading unit further comprises a first axial fixation member and a second axial fixation member arranged on the upper arm in the lateral direction on opposite sides of a group comprising the first lateral boundary member, the second lateral boundary member and the intermediate boundary members, wherein at least one of the first axial fixation member and the second axial fixation member is movable in the lateral direction away from the other of the first axial fixation member and the second axial fixation member.

6. The tire unloading unit according to claim 5, wherein the at least one of the first axial fixation member and the second axial fixation member is biased to move towards the other of the first axial fixation member and the second axial fixation member.

7. The tire unloading unit according to claim 5, wherein each boundary member of the group is pivotable with respect to a normal plane perpendicular to the lateral direction from a first state parallel to said normal plane to a second state at an oblique angle to said normal plane.

8. The tire unloading unit according to claim 7, wherein the first axial fixation member and the second axial fixation member are provided with a first chamfered surface and a second chamfered surface, respectively, facing the group to provide the first lateral boundary member and the second lateral boundary member, respectively, freedom to move from the first state into the second state.

9. The tire unloading unit according to claim 8, wherein the first chamfered surface and the second chamfered surface extend point-symmetrically with respect to each other.

10. The tire unloading unit according to claim 1, wherein the first lateral boundary member, the second lateral boundary member and the plurality of intermediate boundary members each comprise a boundary body with a through opening in the lateral direction for receiving the arm body, wherein the arm body has an arm body height in the clamping direction and wherein the through opening has an opening height in the clamping direction that is greater than the arm body height, wherein the boundary body is slidable over the arm body in the clamping direction within a range defined by the difference between the arm body height and the opening height.

11. The tire unloading unit according to claim 10, wherein the arm body is provided with two oppositely facing guide surfaces extending parallel to the clamping direction, wherein the through opening has two mutually facing sliding surfaces extending parallel to the clamping direction for sliding along the respective guide surfaces of the arm body.

12. The tire unloading unit according to claim 11, wherein the arm body has a rectangular cross section perpendicular to the lateral direction.

13. The tire unloading unit according to claim 1, wherein the first lateral boundary member, the second lateral boundary member and the plurality of intermediate boundary members each comprise a boundary body that is slidably received in a corresponding through hole in the arm body to be movable in the clamping direction relative to said arm body.

14. The tire unloading unit according to claim 1, wherein the first lateral boundary member, the second lateral boundary member and the plurality of intermediate boundary members are movable in the clamping direction relative to the arm body under the influence of gravity.

15. The tire unloading unit according to claim 1, wherein the support member comprises a first lower arm projecting from the base in the lateral direction for supporting the green tire at the externally facing circumferential tread surface from below.

16. The tire unloading unit according to claim 15, wherein the support member further comprises a second lower arm projecting from the base in the lateral direction for together with the first lower arm supporting the green tire at the externally facing circumferential tread surface from below in two circumferentially spaced apart support positions.

* * * * *